United States Patent [19]

Watanabe et al.

[11] Patent Number: 4,492,764

[45] Date of Patent: Jan. 8, 1985

[54] SINTERED CERAMIC BODY CONTAINING TITANIUM CARBONITRIDE

[75] Inventors: Tadahiko Watanabe, Saga; Yuko Tsuya, Tokyo; Yuji Enomoto, Sakura, all of Japan

[73] Assignee: Agency of Industrial Science and Technology, Tokyo, Japan

[21] Appl. No.: 475,976

[22] Filed: Mar. 16, 1983

[30] Foreign Application Priority Data

Jul. 12, 1982 [JP] Japan ................ 57-121748

[51] Int. Cl.³ .............. C04B 35/56; C04B 35/58
[52] U.S. Cl. ............................ 501/87; 501/96
[58] Field of Search ............ 501/87, 96; 75/238, 75/244

[56] References Cited

U.S. PATENT DOCUMENTS

| 3,741,733 | 6/1973 | Kieffer | 75/238 |
| 4,022,584 | 5/1977 | Rudy | 501/98 |
| 4,145,213 | 3/1979 | Oskarsson et al. | 75/238 |
| 4,268,582 | 5/1981 | Hale et al. | 75/238 |

Primary Examiner—Mark Bell
Attorney, Agent, or Firm—Brisebois & Kruger

[57] ABSTRACT

A refractory ceramic body having excellent bending strength and high hardness and with little porosity is obtained by sintering a powdery mixture comprising 5 to 95% by weight of a titanium carbonitride and 95 to 5% by weight of a metal boride such as metal diborides, e.g. titanium diboride, $W_2B_5$ and $Mo_2B_5$ at a temperature of 1700° to 1800° C. Further improvements can be obtained by partial replacement of the above mentioned components with elementary boron, titanium carbide or titanium nitride or when the titanium carbonitride component is a combination of at least two kinds of titanium carbonitrides having different chemical compositions relative to the proportion of the carbon and nitrogen.

16 Claims, No Drawings

SINTERED CERAMIC BODY CONTAINING TITANIUM CARBONITRIDE

BACKGROUND OF THE INVENTION

The present invention relates to a novel sintered ceramic body based on or containing a titanium carbonitride or, more particularly, to a sintered ceramic body containing a titanium carbonitride and a metal boride and having excellent bending strength and hardness as well as outstandingly high density.

Titanium carbonitrides are promising as a material for various sintered ceramic bodies usable as a cutting tool, parts of heavy-duty machines and the like since the sintered ceramic body based on or containing titanium carbonitride is excellent in the high melting point, hardness and tenacity as well as the remarkable resistance against oxidation when used in a high temperature oxidizing atmosphere.

Notwithstanding the above mentioned advantages, titanium carbonitride-containing sintered ceramic bodies are currently not used in the industry at least as a refractory material because a sintered ceramic body prepared from a titanium carbonitride alone is relatively brittle and has an unsatisfactorily low bending strength while this problem of brittleness and poor bending strength cannot be overcome even by the attempts to admix one or more of additive ingredients to the composition to be subjected to sintering due to the counteracting adverse effects on the advantageous properties inherent to the titanium carbonitride. For example, titanium carbonitrides are useful as a matrix material of cermets as sintered with metallic nickel as a binder but such a titanium carbonitride-based cermet is defective due to the decreased resistance against oxidation and poor heat resistance as a result of admixture of the metallic nickel.

Therefore, it has long been desired in the technology of ceramics to develop a sintered ceramic body based on or containing titanium carbonitride and having high bending strength and hardness without suffering decrease in the resistance against oxidation and heat resistance.

SUMMARY OF THE INVENTION

An object of the present invention is to provide a novel and improved sintered ceramic body of high melting point having excellent bending strength and hardness as well as high density due to the absence of any porosity without suffering decrease in the resistance against oxidation and heat resistance as prepared from a powdery mixture comprising a titanium carbonitride as an essential ingredient.

Thus, the sintered ceramic body of the invention developed as a result of the extensive investigations undertaken by the inventors, in which a large number of powdery ceramic materials have been tested as an additive to a titanium carbonitride with the above described object, is a sintered body of a powdery mixture comprising (a) from 5 to 95% by weight of a titanium carbonitride and (b) from 95 to 5% by weight of at least one metal boride selected from the group consisting of $MB_2$ type metal diboride, e.g. diborides of titanium, chromium, tantalum, manganese, molybdenum, vanadium, niobium, hafnium, aluminum and zirconium and $M_2B_5$ type metal borides, e.g. $W_2B_5$ and $Mo_2B_5$, where the total amount of the above described components is at least 50% by weight with the balance, if any, being titanium carbide TiC, titanium nitride TiN or elementary boron. When elementary boron is added to the powdery mixture, the amount thereof should not exceed 10% by weight.

The admixture of the titanium carbide or nitride to the binary mixture of the titanium carbonitride and the metal boride has an effect to impart a further improved $H_v$ hardness of, for example, 2500 kg/mm$^2$ or higher at room temperature to the sintered body in comparison with the sintered bodies prepared from binary mixtures of the components (a) and (b) alone. Similar improvement in the hardness of the sintered body is also obtained when the component (a) is a mixture composed of at least two kinds of titanium carbonitrides having different chemical compositions relative to the proportions of carbon and nitrogen.

DETAILED DESCRIPTION OF THE PREFERRED EMBODIMENTS

The first of the essential components, i.e. component (a), in the powdery mixture to be sintered is a titanium carbonitride which is a chemical entity expressed by the formula $Ti(C_\alpha N_\beta)$, in which the ratio of $\alpha:\beta$ should be in the range from 10:90 to 90:10 or each of the values of $\alpha$ and $\beta$ should be in the range from 0.1 to 0.9, $\alpha + \beta$ being approximately equal to 1. The titanium carbonitride should be in a powdery form having an average particle diameter as fine as possible or, desirably, not exceeding 2 μm. Such a product of titanium carbonitride is commercially available.

The second of the essential components, i.e. component (b), is a metal boride selected from the group consisting of the $MB_2$ type metal diborides including titanium diboride $TiB_2$, chromium diboride $CrB_2$, tantalum diboride $TaB_2$, manganese diboride $MnB_2$, molybdenum diboride $MoB_2$, vanadium diboride $VB_2$, niobium diboride $NbB_2$, hafnium diboride $HfB_2$, aluminum diboride $AlB_2$ and zirconium diboride $ZrB_2$, of which titanium diboride $TiB_2$ is preferred, and $M_2B_5$ type metal borides including tungsten boride $W_2B_5$ and molybdenum boride $Mo_2B_5$. The metal boride should also be in a powdery form having an average particle diameter as fine as possible, preferably, not exceeding 2 μm or, more preferably, not exceeding 0.5 μm. The above named metal borides may be used either alone or as a combination of two kinds or more.

The powdery mixture to be subjected to sintering should comprise from 5 to 95% by weight of the component (a) and from 95 to 5% by weight of the component (b). Although typically the powdery mixture is composed of the components (a) and (b) alone, i.e. the total amount of the components (a) and (b) is substantially equal to 100% except impurities, the essential requirement is that the total amount of the components (a) and (b) should be at least 50% by weight, the balance, if any, being titanium carbide TiC, titanium nitride TiN or elementary boron. When the powdery mixture is composed of the components (a) and (b) alone, the amount of the component (b) should preferably be in the range from 20 to 70% by weight so that further improvements are obtained in the bending strength, hardness and density of the sintered body prepared from the powdery mixture. When the amount of the component (b) in the powdery mixture is smaller than 5% by weight or in excess of 95% by weight, no satisfactory results can be obtained in respect of the bending strength of the sintered body.

The powdery mixture composed of the components (a) and (b), optionally, with addition of a third component, which may be titanium carbide, titanium nitride or elementary boron as mentioned above, is thoroughly blended in a suitable blending machine to obtain intimate contact between particles of the components and a mold of a desired form made of, for example, graphite is filled with the powdery mixture which is subjected to sintering by heating in an atmosphere of vacuum or a neutral or reducing gas such as nitrogen, argon, hydrogen and oxides of carbon under a die pressure of 50 to 300 kg/cm$^2$ at a temperature in the range from 1500° to 2000° C. or, preferably, from 1700° to 1800° C. for a length of time of 10 to 200 minutes into a sintered body. Alternatively to the above mentioned so-called hot-press method, it is of course optional that a green body is first shaped by compression of the powdery mixture at room temperature followed by sintering without die pressure or a so-called H.I.P. process is undertaken.

As is mentioned before, it is sometimes advantageous that the powdery mixture contains a third component which may be titanium carbide TiC, titanium nitride TiN or elementary boron B so that a further improved hardness is obtained in the sintered body assuming that the sintering conditions are the same. For example, a $H_v$ hardness of 2500 kg/mm$^2$ or higher can be obtained by the incorporation of a substantial amount of titanium carbide provided that the total amount of the titanium carbonitride and the metal boride or borides is in excess of 50% by weight. The amount of the elementary boron should be limited not to exceed 10% by weight in the powdery mixture to be sintered.

Quite unexpectedly, it has been discovered that improvements in the hardness of the sintered body can be obtained also when the component (a) of the titanium carbonitride is not of a single composition relative to the values of $\alpha$ and $\beta$ in the chemical formula but is a mixture of two kinds or more of titanium carbonitrides having different compositions from each other relative to the proportion of carbon and nitrogen. In order to take substantial advantage of the above mentioned use of a mixture of titanium carbonitrides, the amount of each of the titanium carbonitrides should be at least 10% by weight in the powdery mixture to be sintered.

As is described in the above, the sintered bodies of the present invention are advantageous in their excellent bending strength, high hardness, high density and very dense structure as well as high resistance against oxidation so that they are very useful as a material for cutting tools and heat-resistant and wearing-resistant parts of heavy-duty machines with very wide applicability. In particular, the metal boride component in the sintered body is effective in improving the sliding performance or decreasing the friction of a machine part made thereof because, when the machine part is used in an environment containing a compound of the element belonging to the IVb group of the Periodic Table, the metal constituent of the boride may react with the IVb element to form a layer of a compound of the metal and the IVb element having good lubricity on the surface of the machine part.

Following are the examples to illustrate the present invention in further detail. In the examples, the chemical composition of each of the titanium carbonitrides is given by the formula $Ti(C_\alpha N_\beta)$ with substitution of respective numerical values giving the molar proportion of the carbon and nitrogen for the suffixes $\alpha$ and $\beta$, such as $Ti(C_{0.5}N_{0.5})$.

EXAMPLE 1

(Experiments No. 1 to No. 28)

Powdery mixtures were prepared each by intimately mixing one of the titanium carbonitrides $Ti(C_{0.3}N_{0.7})$, $Ti(C_{0.5}N_{0.5})$ and $Ti(C_{0.7}N_{0.3})$ and one or more of the metal borides indicated in Table 1 below in the weight proportion also indicated in the same table. The total amount of the titanium carbonitride and the metal boride or borides was equal to 100% in each of the powdery mixtures.

A graphite mold was filled with the powdery mixture which was then compressed in the mold under a die pressure of 200 kg/cm$^2$ with heating at a temperature in the range from 1600° to 2000° C. indicated in Table 1 for 30 minutes to effect sintering. The atmosphere of this hot-press sintering was vacuum in all of the experiments when not mentioned otherwise in the footnotes of the table. The Experiments No. 14 and No. 16 were undertaken by first shaping the powdery mixture at room temperature followed by sintering of the shaped green body at 1850° C. for 2 hours in an atmosphere of argon without die pressure.

The thus obtained sintered bodies were subjected to the measurements of the bending strength and the Vickers hardness $H_v$ at room temperature to give the results shown in Table 1. Further, a section of each of the sintered bodies was examined by use of a scanning electron microscope for pore defects in the structure. The results of this porosity examination are given in Table 1 by the marks A, B and C corresponding to complete absence, presence of a small number and presence of a large number of pores, respectively.

Experiments No. 6 and No. 13 were undertaken for comparative purpose with omission of the metal boride to give sintered bodies having a large number of pores.

Heating of the above prepared sintered bodies according to the invention carried out in air indicated that no oxidation took place up to a heating temperature of 1000° C. while the sintered bodies heated at 1200° C. were found to be covered with an oxide film though insignificantly.

TABLE 1

| Exp. No. | Formulation Titanium carbonitride | Metal boride | Sintering temperature, °C. | Sintered body Bending strength, kg/mm$^2$ | Hardness $H_v$ at room temp., kg/mm$^2$ | Porosity |
|---|---|---|---|---|---|---|
| 1 | 70% $Ti(C_{0.5}N_{0.5})$ | 30% $TiB_2$ | 1600 | 93 | | B |
| 2 | " | " | 1700 | 110 | 2300 | A |
| 3 | " | " | 1800 | 90 | 2350 | A |
| 4 | " | " | 1900 | 86 | | A |
| 5 | " | " | 2000 | 70 | | A |
| 6 | 100% $Ti(C_{0.5}N_{0.5})$ | — | 1700 | 60 | | C |
| 7 | 90% $Ti(C_{0.5}N_{0.5})$ | 10% $TiB_2$ | 1700 | 71 | | A |

TABLE 1-continued

| Exp. No. | Formulation | | Sintering temperature, °C. | Sintered body | | |
|---|---|---|---|---|---|---|
| | Titanium carbonitride | Metal boride | | Bending strength, kg/mm$^2$ | Hardness H$_r$ at room temp., kg/mm$^2$ | Porosity |
| 8 | 80% Ti(C$_{0.5}$N$_{0.5}$) | 20% TiB$_2$ | 1700 | 84 | | A |
| 9 | 60% Ti(C$_{0.5}$N$_{0.5}$) | 40% TiB$_2$ | 1700 | 100 | 2350 | A |
| 10 | 40% Ti(C$_{0.5}$N$_{0.5}$) | 60% TiB$_2$ | 1700 | 104 | 2400 | A |
| 11 | 20% Ti(C$_{0.5}$N$_{0.5}$) | 80% TiB$_2$ | 1700 | 71 | | B |
| 12 | 10% Ti(C$_{0.5}$N$_{0.5}$) | 90% TiB$_2$ | 1700 | 54 | | C |
| 13 | 100% Ti(C$_{0.3}$N$_{0.7}$) | — | 1700 | 51 | | C |
| 14 | 70% Ti(C$_{0.3}$N$_{0.7}$) | 30% TiB$_2$ | 1850$^4$ | 90 | | A |
| 15 | 70% Ti(C$_{0.3}$N$_{0.7}$) | 30% TiB$_2$ | 1700 | 97 | 2050 | A |
| 16 | 60% Ti(C$_{0.3}$N$_{0.7}$) | 40% TiB$_2$ | 1850$^4$ | 75 | | A |
| 17 | 70% Ti(C$_{0.5}$N$_{0.5}$) | 30% TiB$_2$ | 1700$^1$ | 110 | 2300 | A |
| 18 | 70% Ti(C$_{0.7}$N$_{0.3}$) | 30% TiB$_2$ | 1700 | 110 | | A |
| 19 | 50% Ti(C$_{0.5}$N$_{0.5}$) | 50% NbB$_2$ | 1800 | 36 | | A |
| 20 | 55% Ti(C$_{0.5}$N$_{0.5}$) | 45% CrB$_2$ | 1800 | 80 | 2300 | A |
| 21 | 12% Ti(C$_{0.5}$N$_{0.5}$) | 88% W$_2$B$_5$ | 1800 | 74 | 2200 | B |
| 22 | 65% Ti(C$_{0.5}$N$_{0.5}$) | 30% TiB$_2$<br>5% TaB$_2$ | 1700 | 110 | 2300 | A |
| 23 | " | 30% TiB$_2$<br>5% CrB$_2$ | 1700$^2$ | 110 | | A |
| 24 | 67% Ti(C$_{0.5}$N$_{0.5}$) | 30% TiB$_2$<br>3% VB$_2$ | 1700 | 110 | | A |
| 25 | 65% Ti(C$_{0.5}$N$_{0.5}$) | 30% TiB$_2$<br>5% MoB$_2$ | 1700 | 105 | | A |
| 26 | " | 30% TiB$_2$<br>5% HfB$_2$ | 1700 | 95 | | A |
| 27 | " | 30% TiB$_2$<br>5% ZrB$_2$ | 1700$^3$ | 90 | | A |
| 28 | 66% Ti(C$_{0.5}$N$_{0.5}$) | 30% TiB$_2$<br>1% TaB$_2$<br>1% CrB$_2$<br>1% Mo$_2$B$_5$<br>1% W$_2$B$_5$ | 1700 | 110 | | A |

$^1$Sintered in an atmosphere of carbon oxide.
$^2$Sintered in an atmosphere of nitrogen.
$^3$Sintered in an atmosphere of hydrogen.
$^4$Green body shaped without heating was sintered in an atmosphere of argon.

EXAMPLE 2

(Experiments No. 29 to No. 36)

In this case, the total amount of the titanium carbonitride and the metal boride, i.e. titanium diboride TiB$_2$, in each of the powdery mixtures was not equal to 100% and a third component which may be elementary boron, titanium carbide TiC or titanium nitride TiN was admixed as the balance in an amount indicated in Table 2 below. Experiment No. 34 was undertaken for comparative purpose with omission of the titanium carbonitride. The procedure for sintering of the powdery mixture was substantially the same as in Example 1 by the techniques of hot-pressing.

The sintered bodies thus obtained were subjected to the measurements of the bending strength and Vickers hardness at room temperature as well as to the microscopic examination of the porosity in the same manner as in Example 1 to give the results shown in Table 2, in which the marks A, B and C for the evaluation of porosity each have the same meaning as in Table 1.

These sintered bodies according to the invention have resistance against oxidation as high as in the sintered bodies prepared in Example 1 according to the invention.

EXAMPLE 3

(Experiments No. 37 to No. 43)

Powdery mixtures were prepared each by intimately mixing two kinds or more of the titanium carbonitrides Ti(C$_{0.1}$N$_{0.9}$), Ti(C$_{0.3}$N$_{0.7}$), Ti(C$_{0.5}$N$_{0.5}$) and Ti(C$_{0.7}$N$_{0.3}$) with at least one kind of the metal borides indicated in Table 2. Experiment No. 41 was undertaken for comparative purpose with omission of the metal boride. Experiment No. 43 was carried out by the procedure of the green body shaping at room temperature followed by sintering free of pressure at the indicated temperature for 2 hours in an atmosphere of nitrogen.

Table 2 also includes the results of the measurements of the bending strength and Vickers hardness at room temperature and the porosity examination undertaken in the same manner as in Examples 1 and 2. The oxidation resistance of the here prepared sintered bodies was as good as those in the preceding examples.

TABLE 2

| Exp. No. | Formulation | | | Sintering temp., °C. | Sintered body | | |
|---|---|---|---|---|---|---|---|
| | Titanium carbonitride | Metal boride | Others | | Bending strength, kg/mm$^2$ | Hardness H$_r$ at room temp., kg/mm$^2$ | Porosity |
| 29 | 68% Ti(C$_{0.5}$N$_{0.5}$) | 30% TiB$_2$ | 2% B | 1700 | 110 | | A |
| 30 | 15% Ti(C$_{0.5}$N$_{0.5}$) | 35% TiB$_2$ | 50% TiC | 1900 | 60 | | A |
| 31 | 35% Ti(C$_{0.5}$N$_{0.5}$) | 35% TiB$_2$ | 30% TiC | 1900 | 70 | 2500 | A |

TABLE 2-continued

| Exp. No. | Formulation Titanium carbonitride | Metal boride | Others | Sintering temp., °C. | Sintered body Bending strength, kg/mm$^2$ | Hardness H$_r$ at room temp., kg/mm$^2$ | Porosity |
|---|---|---|---|---|---|---|---|
| 32 | 55% Ti(C$_{0.5}$N$_{0.5}$) | 35% TiB$_2$ | 10% TiC | 1900 | 70 | | A |
| 33 | 60% Ti(C$_{0.5}$N$_{0.5}$) | 35% TiB$_2$ | 5% TiC | 1900 | 70 | | A |
| 34 | — | 35% TiB$_2$ | 65% TiC | 1900 | 50 | | A |
| 35 | 64% Ti(C$_{0.5}$N$_{0.5}$) | 35% TiB$_2$ | 1% TiN | 1800 | 70 | | A |
| 36 | 55% Ti(C$_{0.5}$N$_{0.5}$) | 35% TiB$_2$ | 10% TiN | 1800 | 80 | | A |
| 37 | 30% Ti(C$_{0.5}$N$_{0.5}$) 30% Ti(C$_{0.3}$N$_{0.7}$) | 40% TiB$_2$ | — | 1700 | 100 | 2500 | A |
| 38 | 40% Ti(C$_{0.5}$N$_{0.5}$) 40% Ti(C$_{0.3}$N$_{0.7}$) | 20% TiB$_2$ | — | 1700 | 70 | | A |
| 39 | 20% Ti(C$_{0.5}$N$_{0.5}$) 20% Ti(C$_{0.3}$N$_{0.7}$) | 60% TiB$_2$ | — | 1700 | 100 | 2600 | A |
| 40 | 10% Ti(C$_{0.5}$N$_{0.5}$) 10% Ti(C$_{0.3}$N$_{0.7}$) | 80% TiB$_2$ | — | 1700 | 70 | | B |
| 41 | 30% Ti(C$_{0.5}$N$_{0.5}$) 30% Ti(C$_{0.3}$N$_{0.7}$) | — | — | 1700 | 50 | | C |
| 42 | 10% Ti(C$_{0.1}$N$_{0.9}$) 20% Ti(C$_{0.3}$N$_{0.7}$) 20% Ti(C$_{0.5}$N$_{0.5}$) 10% Ti(C$_{0.7}$N$_{0.3}$) | 35% TiB$_2$ 2% TaB$_2$ 3% Mo$_2$B$_5$ | — | 1700 | 100 | 2500 | A |
| 43 | 30% Ti(C$_{0.5}$N$_{0.5}$) 30% Ti(C$_{0.3}$N$_{0.7}$) | 30% TiB$_2$ | 10% B | 1700* | 110 | 2500 | A |

*See text.

What is claimed is:

1. A titanium carbonitride-based ceramic body prepared by sintering a powdery mixture consisting essentially of
   (a) from 5 to 95% by weight of a titanium carbonitride,
   (b) from 95 to 5% by weight of at least one metal boride selected from the group consisting of titanium diboride TiB$_2$, chromium diboride CrB$_2$, tantalum diboride TaB$_2$, manganese diboride MnB$_2$, molybdenum diboride MoB$_2$, vanadium diboride VB$_2$, niobium diboride NbB$_2$, hafnium diboride HfB$_2$, aluminum diboride AlB$_2$ and zirconium diboride ZrB$_2$, tungsten boride W$_2$B$_5$ and molybdenum boride Mo$_2$B$_5$,
   (c) from 0 to 10% by weight elementary boron, and
   (d) from 0 to 50% by weight of titanium carbide or titanium nitride.

2. The titanium carbonitride-based ceramic body as claimed in claim 1 wherein the metal boride is titanium diboride TiB$_2$.

3. The titanium carbonitride-based ceramic body as claimed in claim 1 wherein the powdery mixture contains elementary boron in an amount in the range from 1 to 10% by weight.

4. The titanium carbonitride-based ceramic body as claimed in claim 1 wherein the powdery mixture contains titanium carbide or titanium nitride in an amount up to 50% by weight.

5. The titanium carbonitride-based ceramic body as claimed in claim 1 wherein the component (a) in the powdery mixture is a combination of at least two kinds of titanium carbonitrides having different chemical compositions relative to the proportion of carbon to nitrogen.

6. The titanium carbonitride-based ceramic body as claimed in claim 5 wherein the amount of each of the titanium carbonitrides is at least 10% by weight in the powdery mixture.

7. The titanium carbonitride-based ceramic body as claimed in claim 1 wherein the titanium carbonitride in the powdery mixture has an average particle diameter not exceeding 2 μm.

8. The titanium carbonitride-based ceramic body as claimed in claim 1 wherein the metal boride in the powdery mixture has an average particle diameter not exceeding 2 μm.

9. The titanium carbonitride-based ceramic body as claimed in claim 1 wherein the amount of the metal boride in the powdery mixture is in the range from 20 to 70% by weight.

10. A titanium carbonitride-based ceramic body prepared by sintering a powdery mixture consisting essentially of
    (a) from 5 to 95% by weight of a titanium carbonitride, and
    (b) from 95 to 5% by weight of at least one metal boride selected from the group consisting of titanium diboride TiB$_2$, chromium diboride CrB$_2$, tantalum diboride TaB$_2$, manganese diboride MnB$_2$, molybdenum diboride MoB$_2$, vanadium diboride VB$_2$, niobium diboride NbB$_2$, hafnium diboride HfB$_2$, aluminum diboride AlB$_2$ and zirconium diboride ZrB$_2$, tungsten boride W$_2$B$_5$ and molybdenum boride Mo$_2$B$_5$.

11. The titanium carbonitride-based ceramic body as claimed in claim 10 wherein the metal boride is titanium diboride TiB$_2$.

12. The titanium carbonitride-based ceramic body as claimed in claim 10 wherein the component (a) in the powdery mixture is a combination of at least two kinds of titanium carbonitrides having different chemical compositions relative to the proportion of carbon to nitrogen.

13. The titanium carbonitride-based ceramic body as claimed in claim 12 wherein the amount of each of the titanium carbonitrides is at least 10% by weight in the powdery mixture.

14. The titanium carbonitride-based ceramic body as claimed in claim 10 wherein the titanium carbonitride in the powdery mixture has an average particle diameter not exceeding 2 μm.

15. The titanium carbonitride-based ceramic body as claimed in claim 10 wherein the metal boride in the powdery mixture has an average particle diameter not exceeding 2 μm.

16. The titanium carbonitride-based ceramic body as claimed in claim 10 wherein the amount of the metal boride in the powdery mixture is in the range from 20 to 70% by weight.

* * * * *

UNITED STATES PATENT AND TRADEMARK OFFICE
CERTIFICATE OF CORRECTION

PATENT NO. : 4,492,764
DATED : January 8, 1985
INVENTOR(S) : Tadahiko Watanabe et al.

It is certified that error appears in the above-identified patent and that said Letters Patent is hereby corrected as shown below:

On the title page assignee should read:

--(73) Assignee: Director-General Of The Agency Of Industrial Science and Technology --.

Signed and Sealed this

Twenty-first Day of May 1985

[SEAL]

Attest:

DONALD J. QUIGG

Attesting Officer     Acting Commissioner of Patents and Trademarks